(12) United States Patent
Patrick (10) Patent No.: US 7,738,531 B2
(45) Date of Patent: *Jun. 15, 2010

(54) METHOD AND APPARATUS FOR REDUCING CODE PHASE SEARCH SPACE

(75) Inventor: Christopher Patrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/115,342

(22) Filed: May 5, 2008

(65) Prior Publication Data

US 2008/0285630 A1    Nov. 20, 2008

Related U.S. Application Data

(63) Continuation of application No. 09/741,631, filed on Dec. 18, 2000, now Pat. No. 7,369,599.

(60) Provisional application No. 60/219,181, filed on Jul. 19, 2000.

(51) Int. Cl.
    *H04B 1/01*    (2006.01)
(52) U.S. Cl. ................... 375/141; 375/150; 375/343; 342/378; 701/207
(58) Field of Classification Search ................ 375/141, 375/150, 343; 342/378; 701/207
    See application file for complete search history.

(56) References Cited

U.S. PATENT DOCUMENTS

| 4,114,155 | A | * | 9/1978  | Raab ..................... 342/394 |
| 5,493,588 | A |   | 2/1996  | Lennen |
| 5,752,218 | A |   | 5/1998  | Harrison et al. |
| 6,070,078 | A |   | 5/2000  | Camp, Jr. et al. |
| 6,298,229 | B1|   | 10/2001 | Tomlinson, Jr. et al. |
| 6,304,216 | B1|   | 10/2001 | Gronemeyer |
| 6,323,805 | B1|   | 11/2001 | Zou et al. |
| 6,433,739 | B1|   | 8/2002  | Soliman |
| 6,445,928 | B1|   | 9/2002  | Ruutu et al. |
| 6,538,600 | B1|   | 3/2003  | Richton et al. |

FOREIGN PATENT DOCUMENTS

| EP | 0902554    | 3/1999 |
| KR | 2001-0006455 | 1/2001 |
| WO | 9919743    | 4/1999 |
| WO | 0041416    | 7/2000 |

* cited by examiner

*Primary Examiner*—Ted M Wang
(74) *Attorney, Agent, or Firm*—Shyam K. Parekh (57) ABSTRACT

A GPS communication system including a server and a client, each including a GPS receiver, for reducing the code phase search space of the GPS receiver of the client. The communication system includes a transmitter for transmitting timing information from the server to the client to help the client locate a first satellite, and a receiver for using timing differences between the satellites to synchronize and locate other satellites. The code phase search space is reduced by reducing the number of phase hypotheses that must be calculated to establish communication between the server and the client.

40 Claims, 14 Drawing Sheets

METHOD AND APPARATUS FOR REDUCING CODE PHASE SEARCH SPACE

CLAIM OF PRIORITY AND RELATED APPLICATIONS

This application is a non-provisional application claiming priority to provisional application Ser. No. 60/219,181, filed on Jul. 19, 2000 entitled Reducing Code Phase Search Space for a Receiver in a Distributed System, which is incorporated by reference herein in its entirety. This application is a continuation of utility application Ser. No. 09/741,631, filed on Dec. 18, 2000 entitled Method and Apparatus for Reducing Code Phase Search Space, which is incorporated by reference herein in its entirety.

BACKGROUND

1. Field

The present invention relates to reducing code phase search space for a receiver in a distributed system.

2. Description of Related Art

A satellite positioning system comprises a set of orbiting satellites (also called space vehicles or 'SVs') that broadcast signals from which a receiver may determine its position. Two such systems are the NAVSTAR GPS system referenced herein (as described in Global Positioning System, Standard Positioning Service Signal Specification, second edition, Jun. 2, 1995, U.S. Coast Guard Navigation Center, Alexandria, Va.) and the Global Orbiting Navigational System (GLONASS) maintained by the Russian Republic. In order to determine its three-dimensional position within such a positioning system, a receiver must first acquire the signals of four SVs. The initial acquisition of each SV signal is typically computation-intensive and may take up to several minutes.

To acquire a GPS signal, a receiver must lock onto both the frequency of the carrier signal and the phase of the code modulated onto the carrier. Because of the motion of the SV relative to the receiver and the resulting Doppler shift, the frequency of the received carrier may change. Inaccuracies in the receiver's local oscillator may cause an additional frequency error. Therefore, locking onto the carrier may require the receiver to search for the signal across a range of frequencies.

Each SV transmits a signal that is spread by direct-sequence spread spectrum modulation. Specifically, each SV transmits a signal that is spread by a known digital pseudo-random (or 'pseudonoise') code called a coarse acquisition (CA) code. This periodic code has a chip rate of 1.023 MHz and repeats every 1,023 symbols (i.e. once per millisecond). A signal received at a receiver may be a composite of signals transmitted by several SVs.

Figure 1:
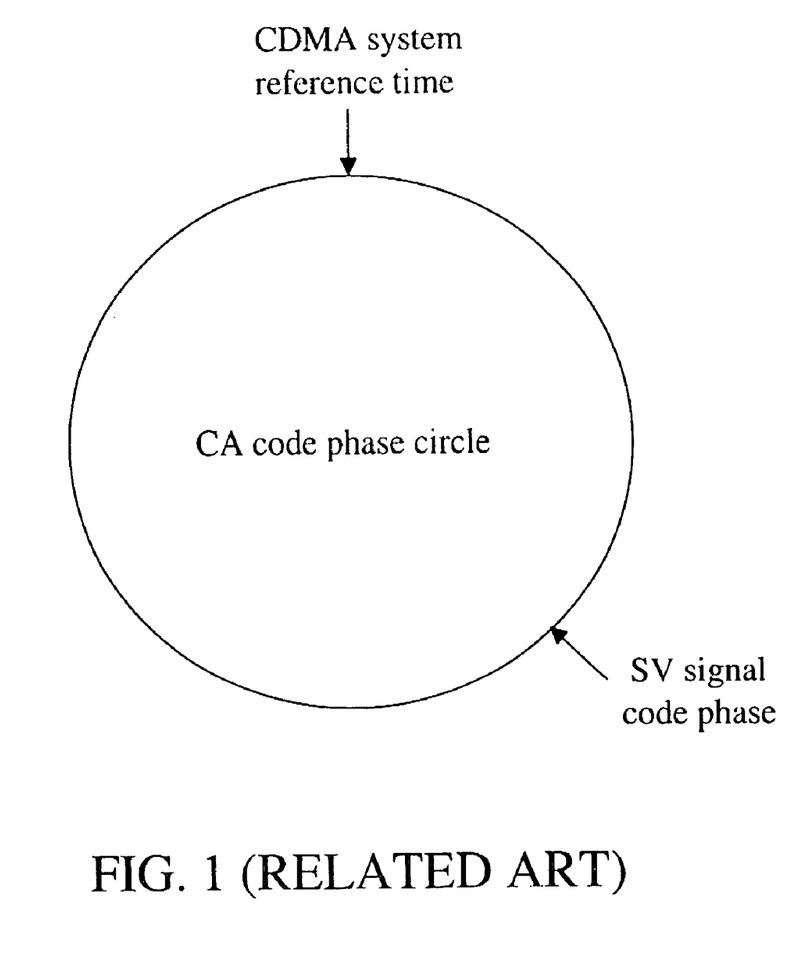
FIG. 1 shows a CDMA system that has a system reference time.

The code phase of a received SV signal is established by the location in time of a predetermined position within the signal's CA code. As the CA codes are periodic, the possible locations of the predetermined position (i.e. the possible code phases) may be represented as points along the circumference of a circle, as shown in FIG. 1. Determining the code phase of a received signal requires searching for a correlation (e.g. between the receiver output and a code sequence based on the particular CA code) at each position on the circle until the code is located in the received signal (e.g. as indicated by the occurrence of a correlation peak).

Because the nominal carrier frequency of a GPS signal is 1.575 GHz, it may be difficult to maintain a signal lock in areas such as indoors, inside vehicles, and/or beneath tree canopies. When a portable GPS receiver loses a signal lock, an inconvenient suspension of positioning ability and a drain on computational resources may be sustained while the receiver attempts to reacquire the signal. As the frequency offset changes rather slowly, re-establishing a frequency lock after a short break may require only a limited effort. The code phase of a received signal changes more quickly, however, and it may be necessary to search for the lost signal across the entire 1,023-symbol code phase circle. For applications in which accurate position information must be available on demand, such a delay may be unacceptable. Of course, it may be beneficial to avoid long delays during initial acquisition as well.

It is desirable to augment certain wireless systems for mobile communications by adding the capability to locate the position of a particular mobile unit. One reason is a regulation promulgated by the Federal Communications Commission (third report and order adopted Sep. 15, 1999, released Oct. 6, 1999). This regulation requires all cellular carriers in the United States to be able to locate the position of a cellular telephone making a 911 call to within 50 meters for 67% of calls (and to within 150 meters for 95% of calls) by October 2001. Other uses for positional location capability in wireless communication systems include value-added consumer features such as navigation and vehicle fleet management support.

One option for adding position location to such a communications system is to add GPS receiving capability to the mobile units. However, such an approach suffers from the difficulty of maintaining reliable reception of GPS signals in many areas where mobile units are commonly used, such as indoors and within vehicles. On the other hand, the base stations in such a system are typically well-situated in terms of satellite visibility, and it may be feasible for the base stations to assist the mobile stations by collecting information on SV signals (including code phase) and forwarding it to the mobile stations.

In a code-division multiple-access CDMA system for wireless communications, operations by the mobile and base stations are synchronized to a common time base (see FIG. 1). Because of this feature, a base station can send code phase information relative to the time base that will be meaningful to a mobile station. Because of differences in the positions of the base and mobile stations, and because of inaccuracies in the mobile units' local oscillators, the code phase information sent by a base station may not coincide precisely with the code phase of the GPS signal received by a mobile unit. Nevertheless, such a procedure may substantially reduce the size of the code phase search base (for example, from 1,023 symbols to only 30).

In an analog system for wireless communications such as the advanced mobile phone service (AMPS) system widely used in the United States, however, no such time base exists between the mobile stations and the base station. Indeed, the operations of the stations may not be synchronized to within even one millisecond (i.e. the time to traverse an entire code phase circle). Therefore, no system reference point exists in relation to which the base stations may transmit meaningful code phase information (see FIG. 2). Therefore, in an AMPS system which supports GPS location ability by the mobile stations, any acquisition and reacquisition of a satellite lock may require searching the entire code phase circle. It is desirable to reduce the code phase search space in such distributed GPS systems.

SUMMARY

A system, method, and apparatus for reducing code phase search space in a code division multiple access receiver, such as a GPS receiver. The reduction is obtained by applying information pertaining to a time relation between the code phases of two received signals. The time relationship provides the ability to know the code phase of the second signal if the code phase of the first signal is known. Knowing the code phase of the second signal reduces the search space, since the searcher can go directly to the anticipated code phase.

BRIEF DESCRIPTION OF THE DRAWINGS

The accompanying drawings, which are incorporated in and constitute a part of this specification, illustrate an embodiment of the invention and, together with the description, explain the advantages and principles of the invention. In the drawings.

DETAILED DESCRIPTION OF THE DRAWINGS

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

Figure 3:
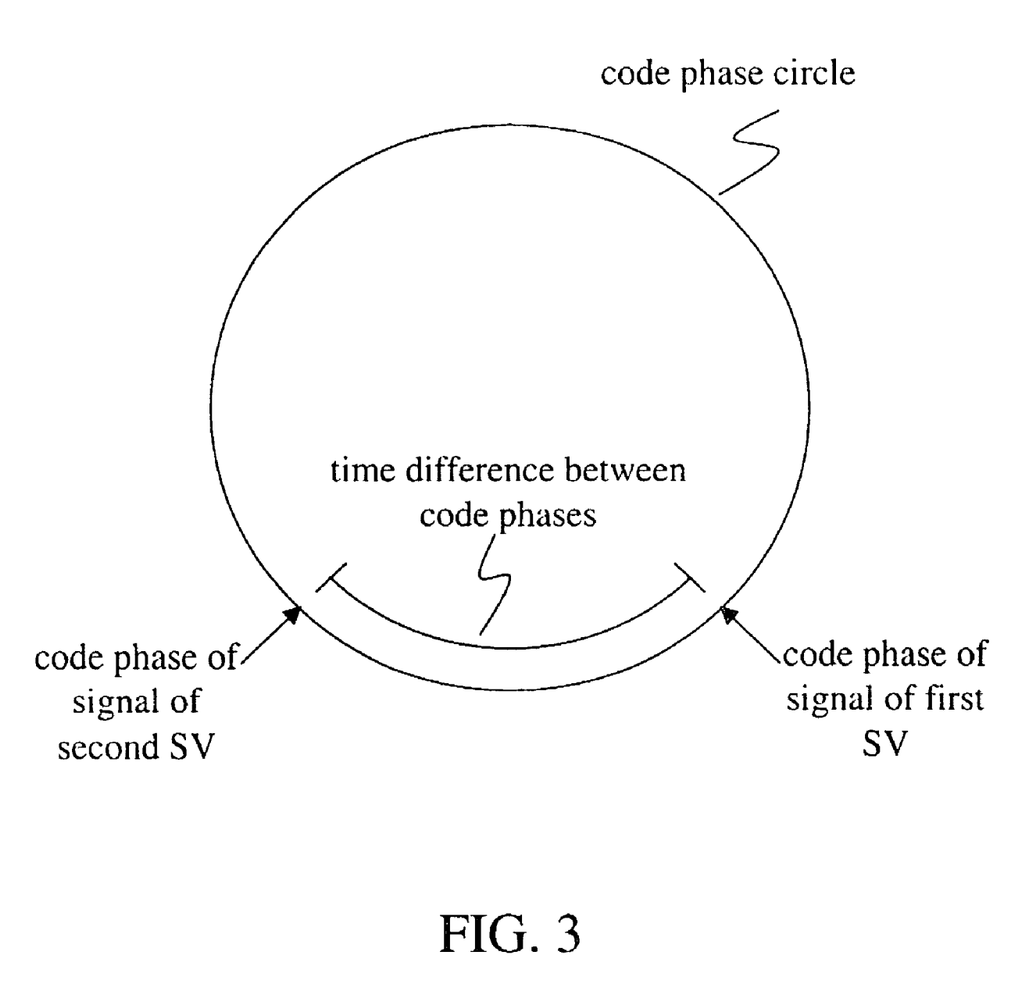
FIG. 3 shows how a code phase of a signal may be determined from (1) a code phase of another signal and (2) a time difference between the code phases.
Figure 4:
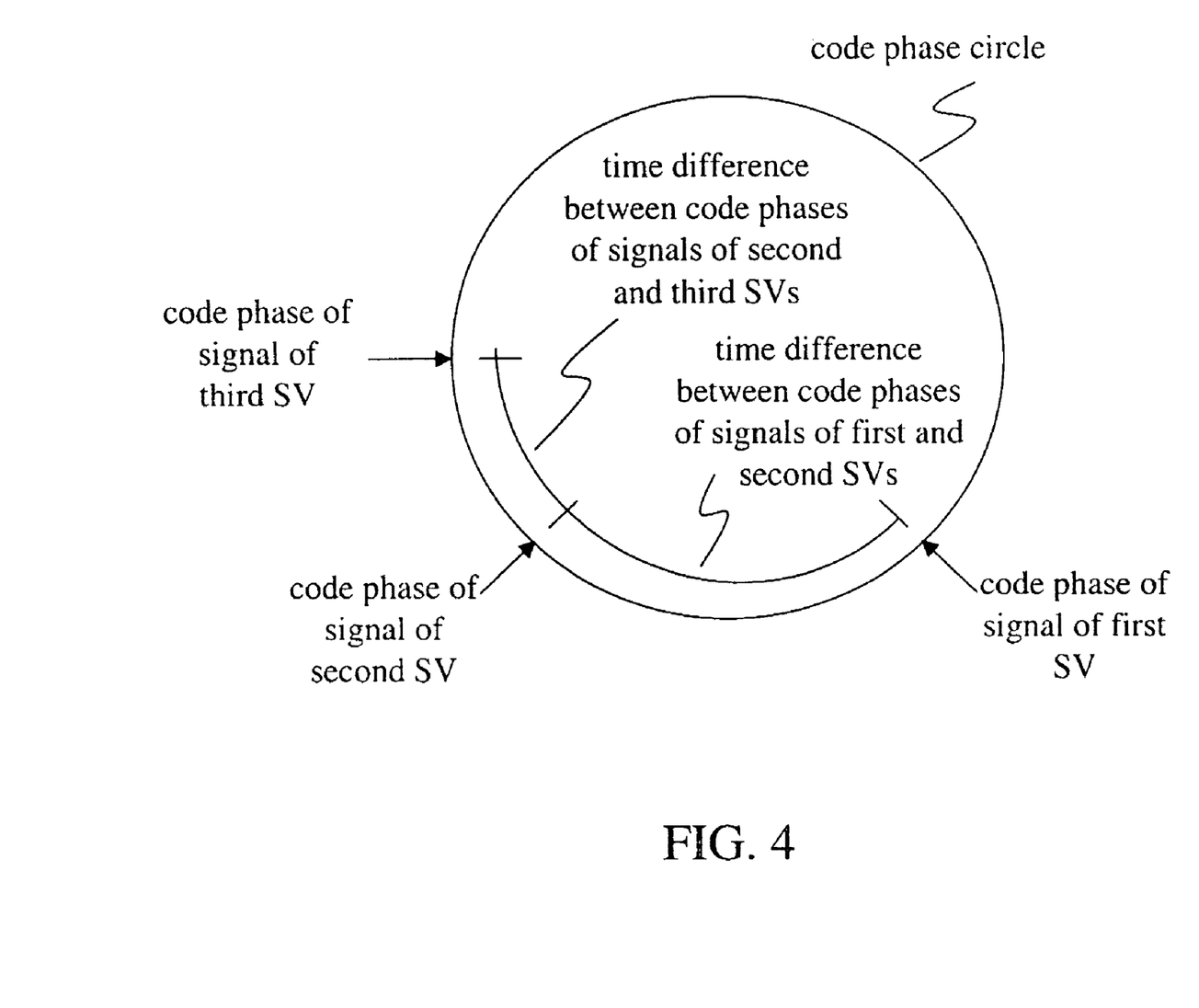
FIG. 4 shows one approach to representing time differences between code phases for more than two signals.
Figure 5:
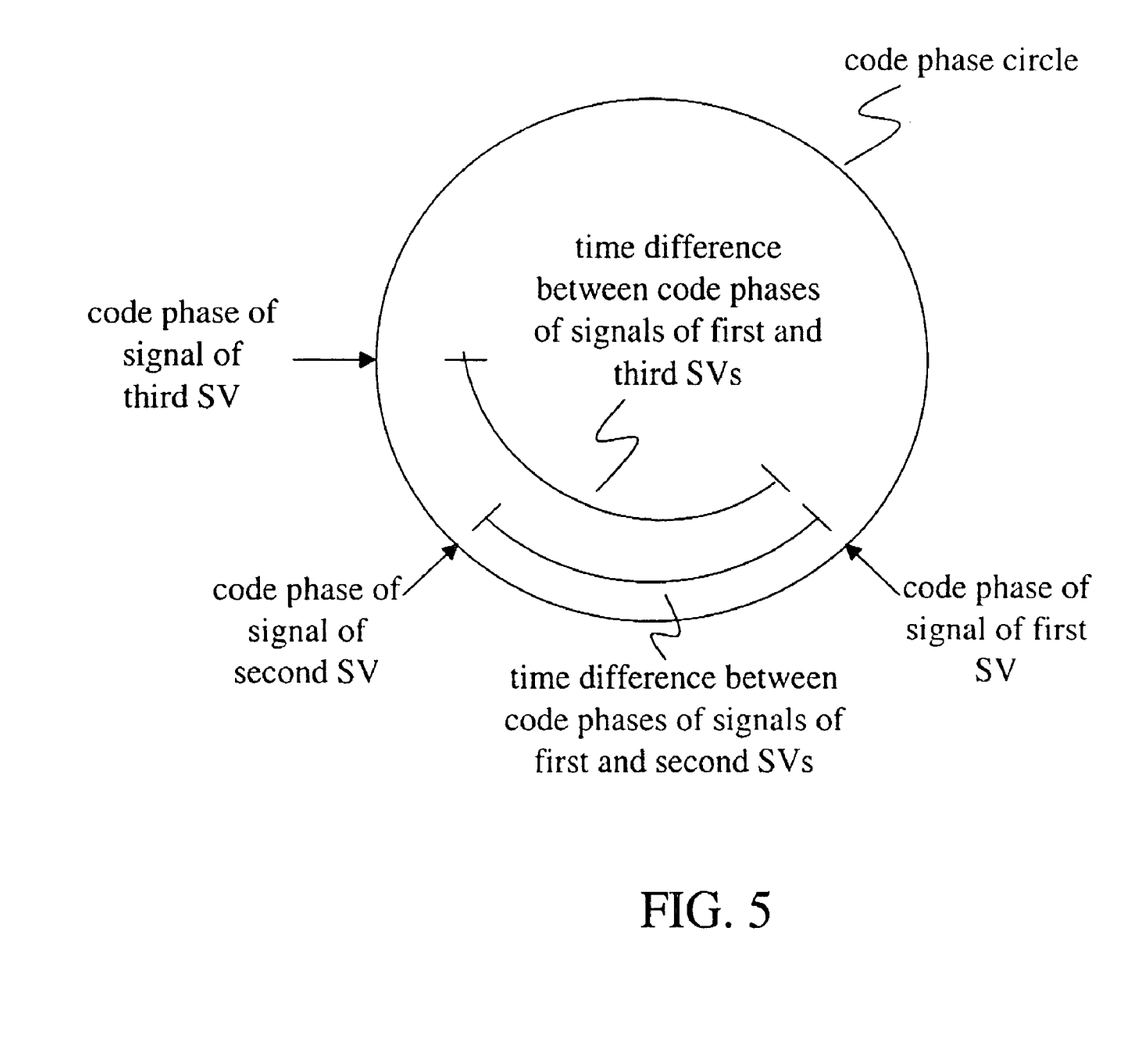
FIG. 5 shows another approach to representing time differences between code phases for more than two signals.

In a system, method, and apparatus according to an embodiment of the invention, the code phase of a second received signal is localized by using the following items of time information: (1) the code phase of a first received signal and (2) a time relation between the code phases of the two received signals (for example, a time difference as shown in FIG. 3). This approach may be extended to allow localization of additional received signals by providing incremental time differences (i.e. with respect to another received signal, as shown in FIG. 4) and/or accumulated time differences (i.e. with respect to the first received signal, as in FIG. 5).

Figure 6:
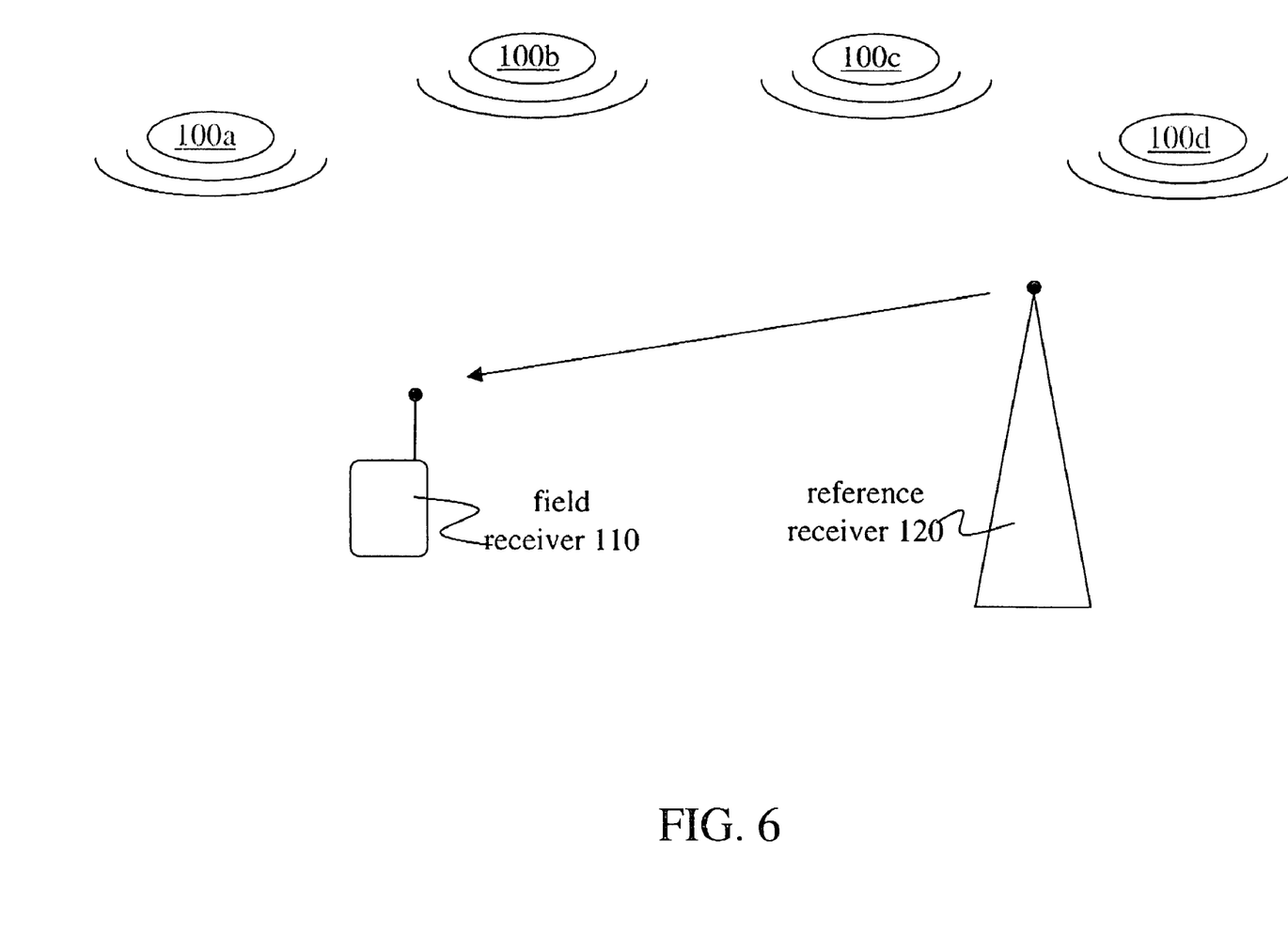
FIG. 6 shows a system according to an embodiment of the invention and a plurality of SVs 100.

FIG. 6 shows a block diagram for a system according to an embodiment of the invention that includes a field receiver 110 and a reference receiver 120. Reference receiver 120 receives signals from at least a first and a second SV 100 and determines the code phases of these received signals (e.g. by correlation with a local copy of the known CA code). Information pertaining to a time relation between the code phases of the received signals is then transmitted to field receiver 110. Upon determining the code phase of a signal from the first SV 100, field receiver 110 uses the time relation information to reduce the size of the space it must search in determining the code phase of the signal from the second SV 100.

Figure 7:
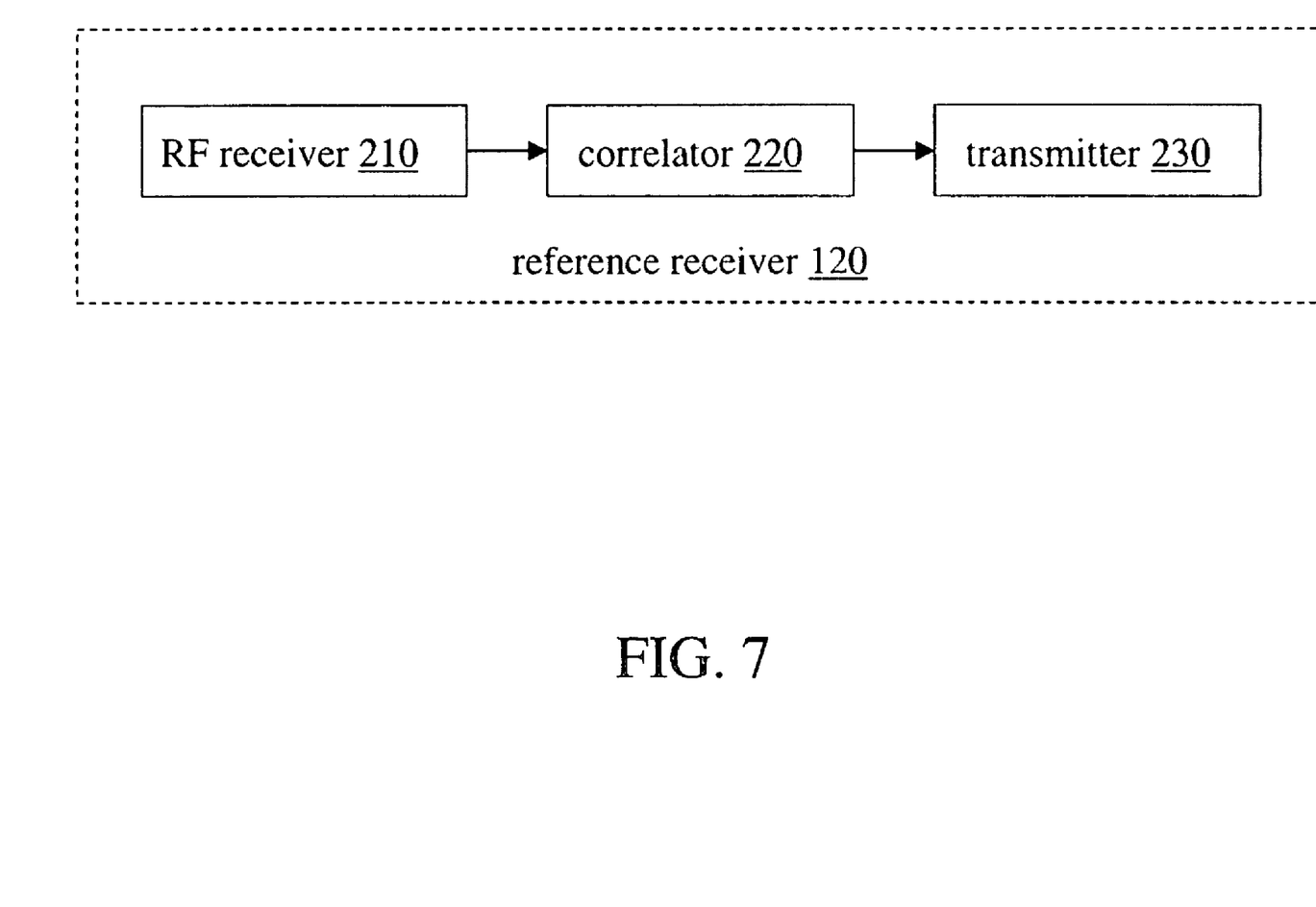
FIG. 7 shows a block diagram for an apparatus 120 according to an embodiment of the invention.

FIG. 7 shows a block diagram for a reference receiver 120 according to an embodiment of the invention. Within reference receiver 120, radio-frequency (RF) receiver 210 receives modulated carrier signals from at least two SVs and outputs the corresponding demodulated signals to correlator 220. Correlator 220 determines the code phases of the received signals and outputs information relating to a difference among those code phases to transmitter 230 (e.g. as shown in tasks P110 and P120 of FIG. 8).

Figure 8:
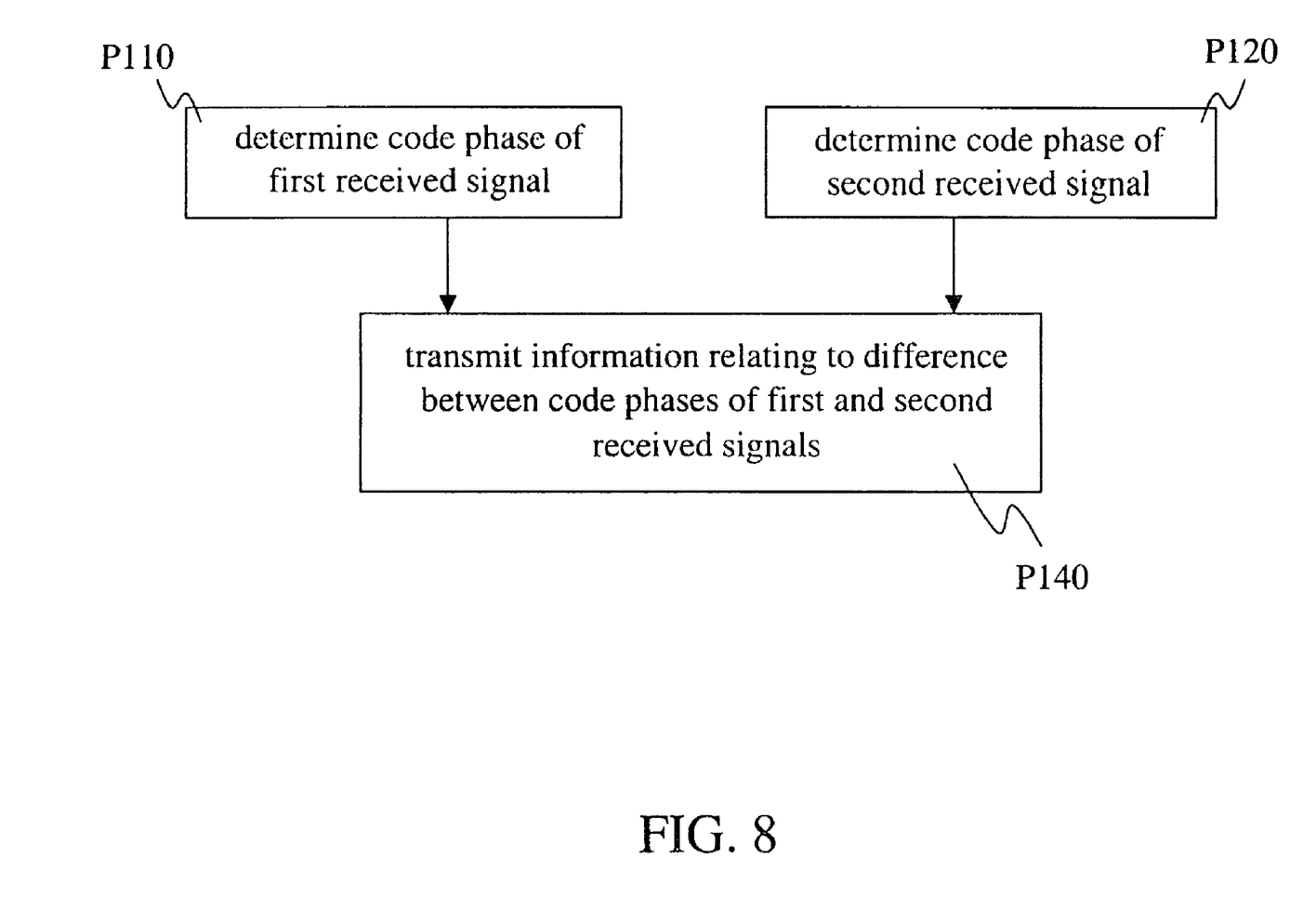
FIG. 8 shows a flow chart for a method according to an embodiment of the invention.
Figure 9:
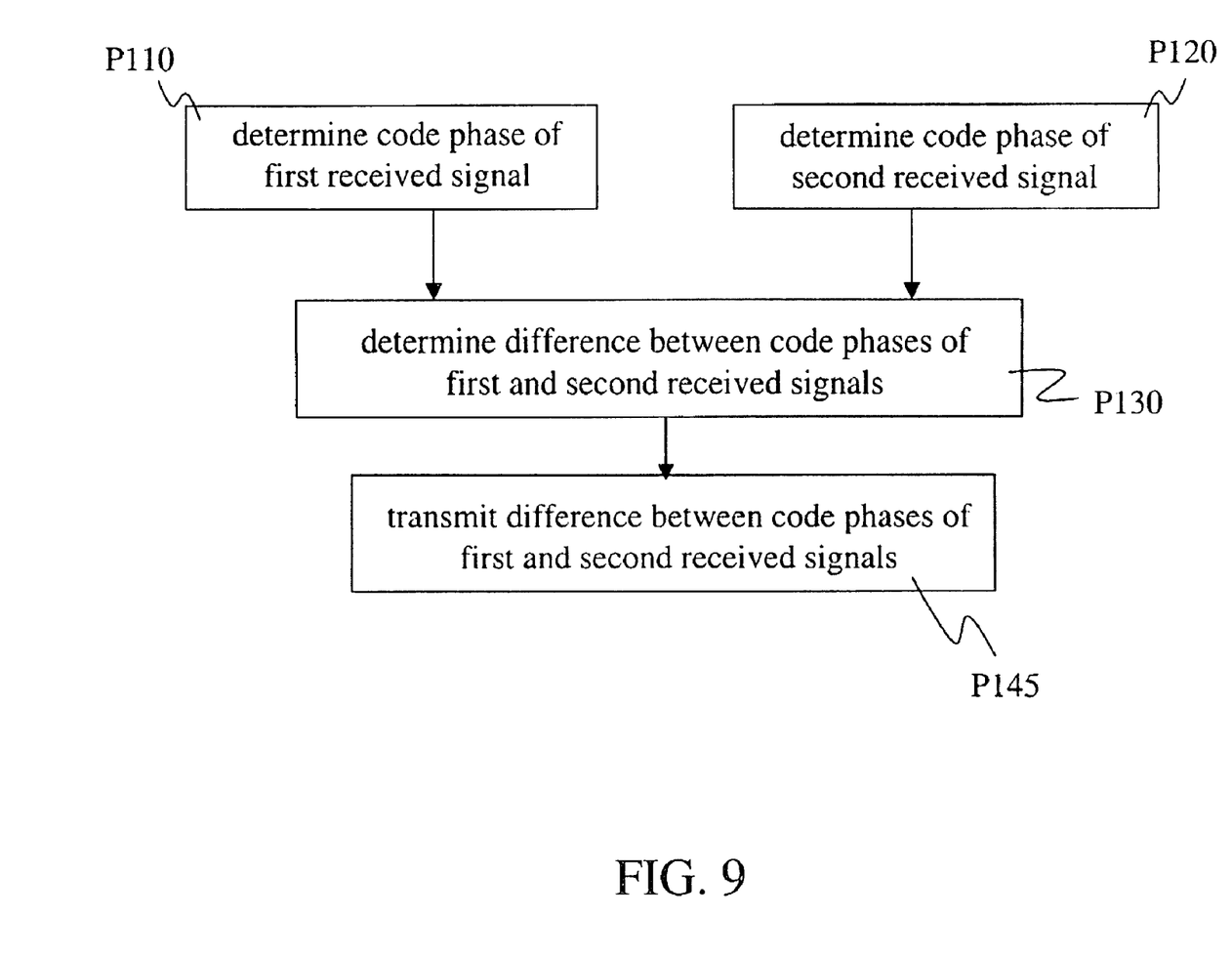
FIG. 9 shows a flow chart for a method according to another embodiment of the invention.
Figure 10:
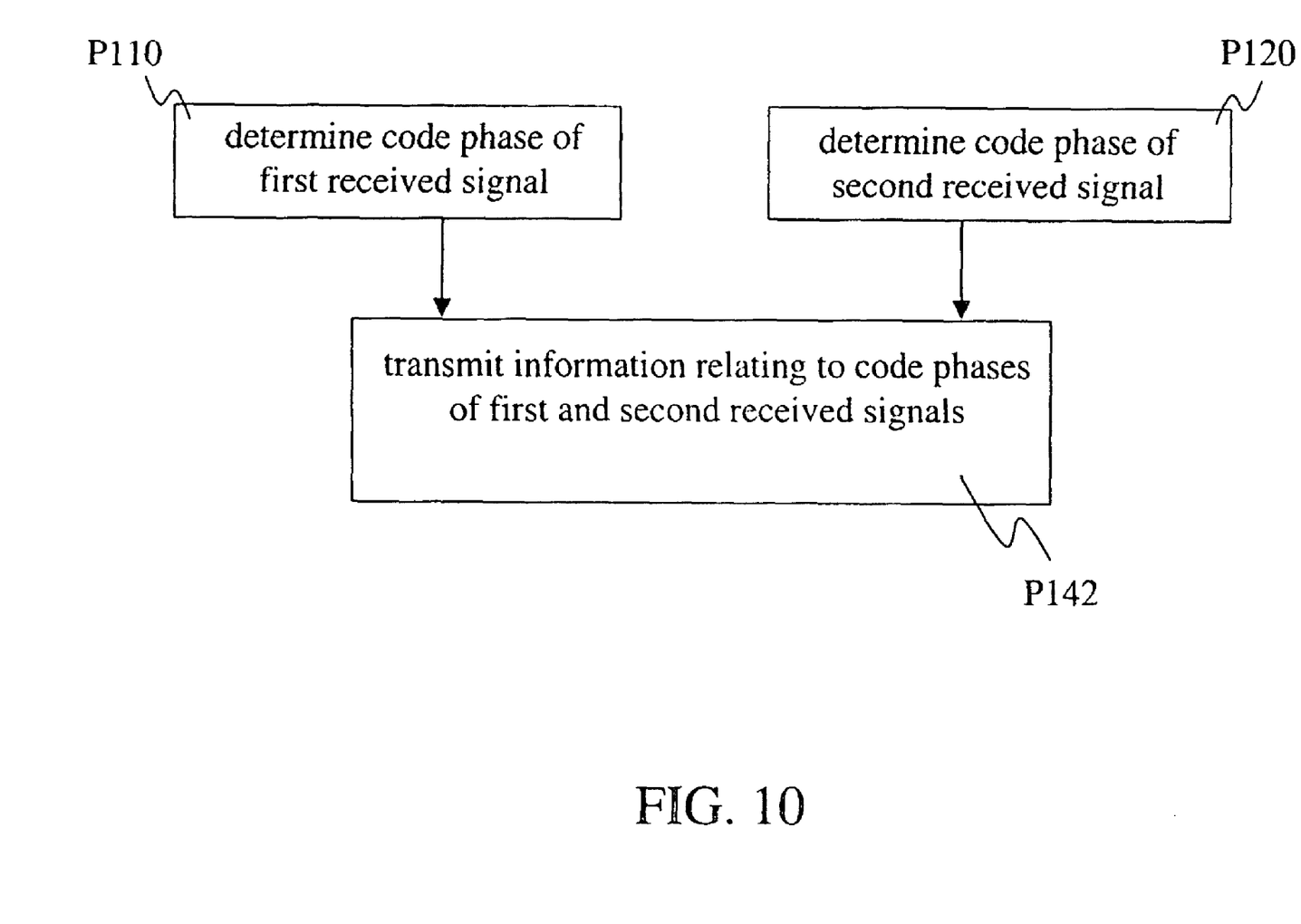
FIG. 10 shows a flow chart for a method according to a further embodiment of the invention.

Transmitter 230 transmits the information outputted by correlator 220, as shown in task P140 of FIG. 8. In one example, correlator 220 determines the difference between the code phases, and transmitter 230 transmits this difference (e.g. as shown in tasks P130 and P145 of FIG. 9). In the alternative example of FIG. 10, transmitter 230 transmits information relating to the code phases of the received signals (task P142), and the receiver of this information (e.g. field receiver 110) performs the task of determining the time difference between the code phases.

Figure 11:
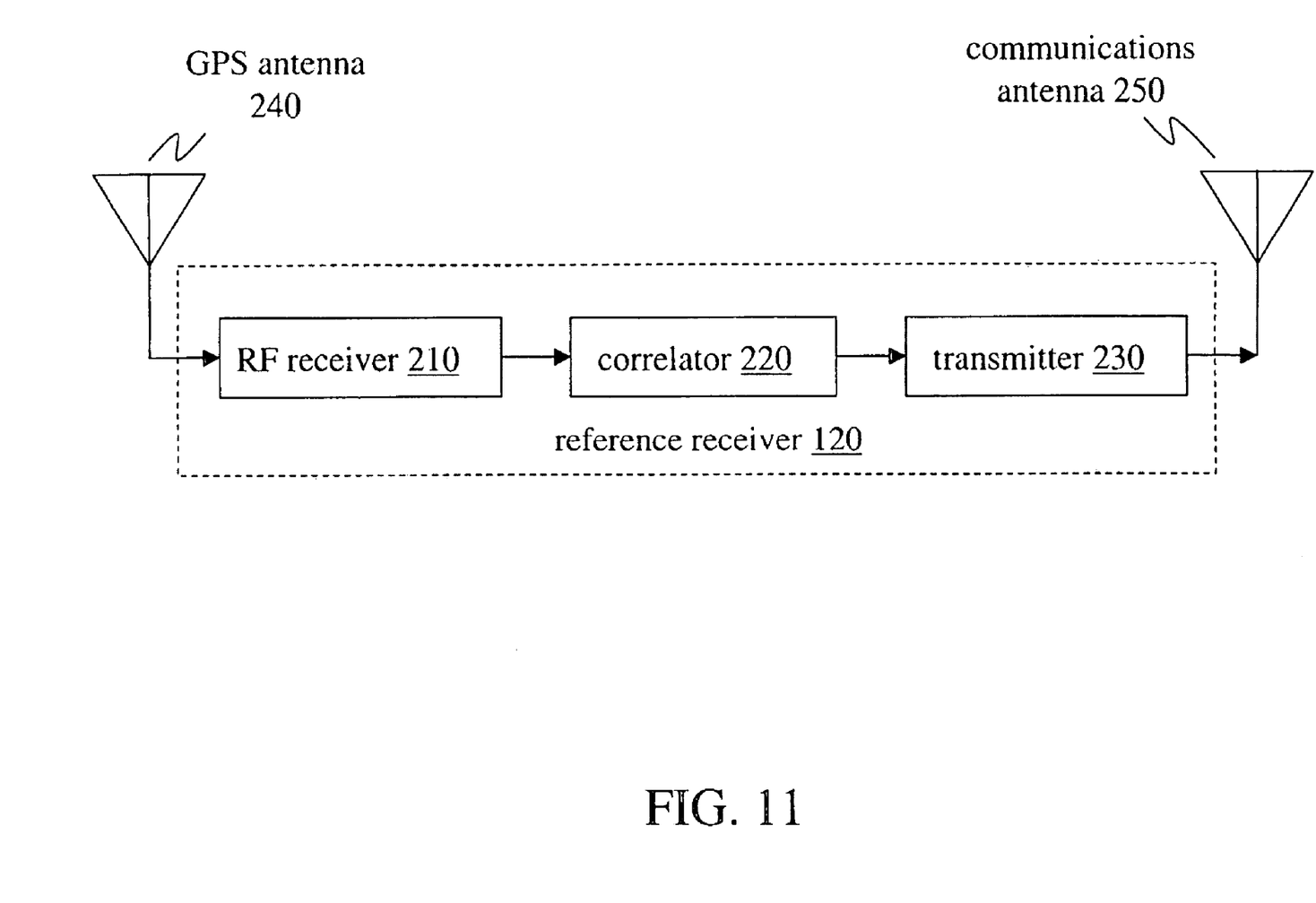
FIG. 11 shows a block diagram for an exemplary implementation of an apparatus 120 according to an embodiment of the invention.

FIG. 11 shows an exemplary implementation of reference receiver 120. In this example, RF receiver 210 receives signals from SVs 100 via GPS antenna 240. The code phase information as discussed above is then transmitted by transmitter 230 (e.g. to one or more field receivers 110) via communications antenna 250.

Reference receiver 120 may be collocated with and/or integrated into a base station of a system for wireless communications. In this case, the location of reference receiver 120 may typically be known to a high degree of accuracy.

Figure 12:
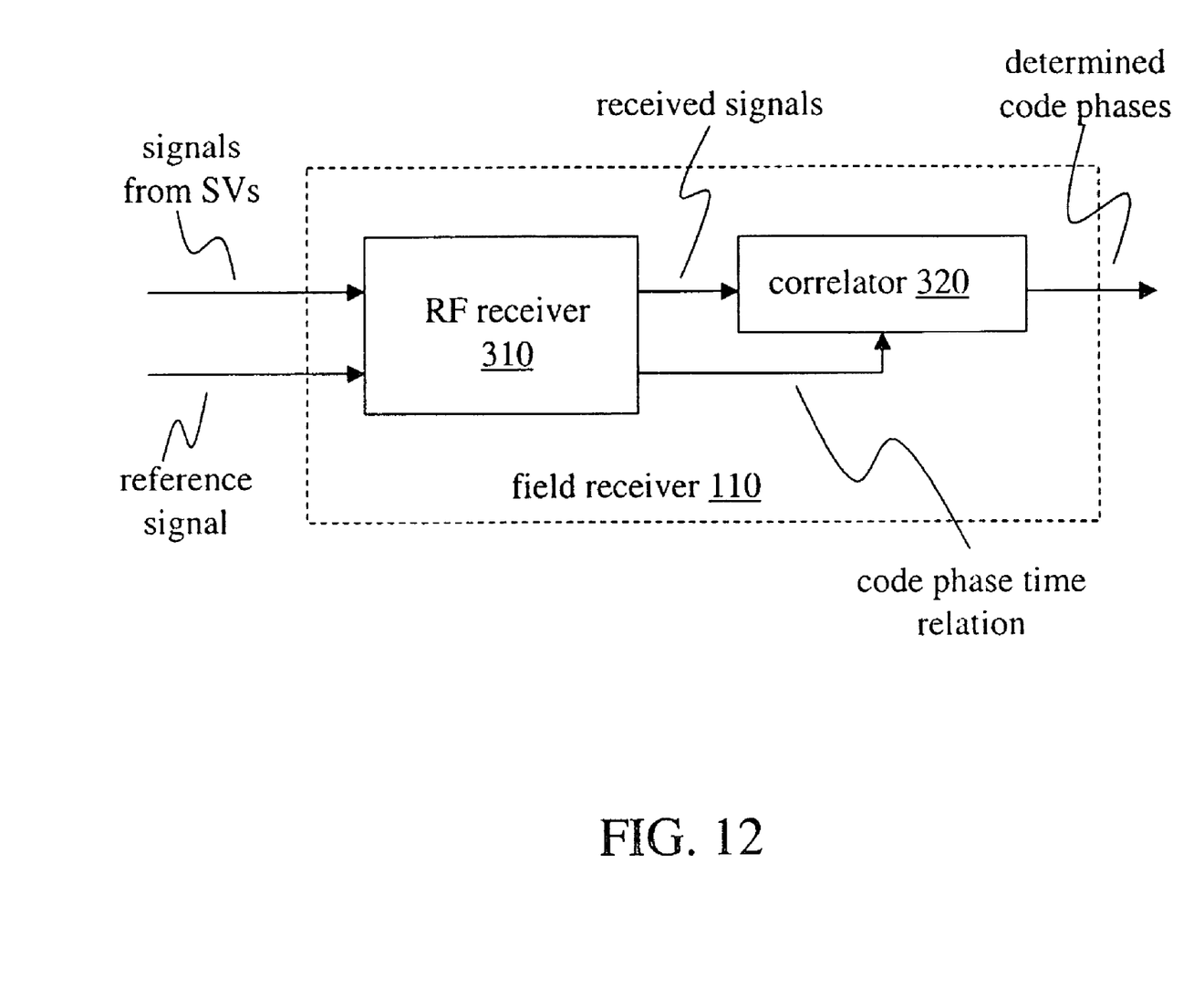
FIG. 12 shows a block diagram for an apparatus 110 according to an embodiment of the invention.

As shown in FIG. 12, a field receiver 110 according to an embodiment of the invention includes a receiver 310 that receives signals from at least two SVs. Radio-frequency receiver 310 also receives a reference signal, from which it derives a time relation (e.g. a difference) between the code phases of the signals of the SVs as received at a reference receiver.

For the signal received from a first SV, correlator 320 determines the code phase. Correlator 320 combines this code phase information with a time relation between the signal of the first SV and the signal of a second SV in order to reduce the code phase search space for the signal of the second SV.

Figure 13:
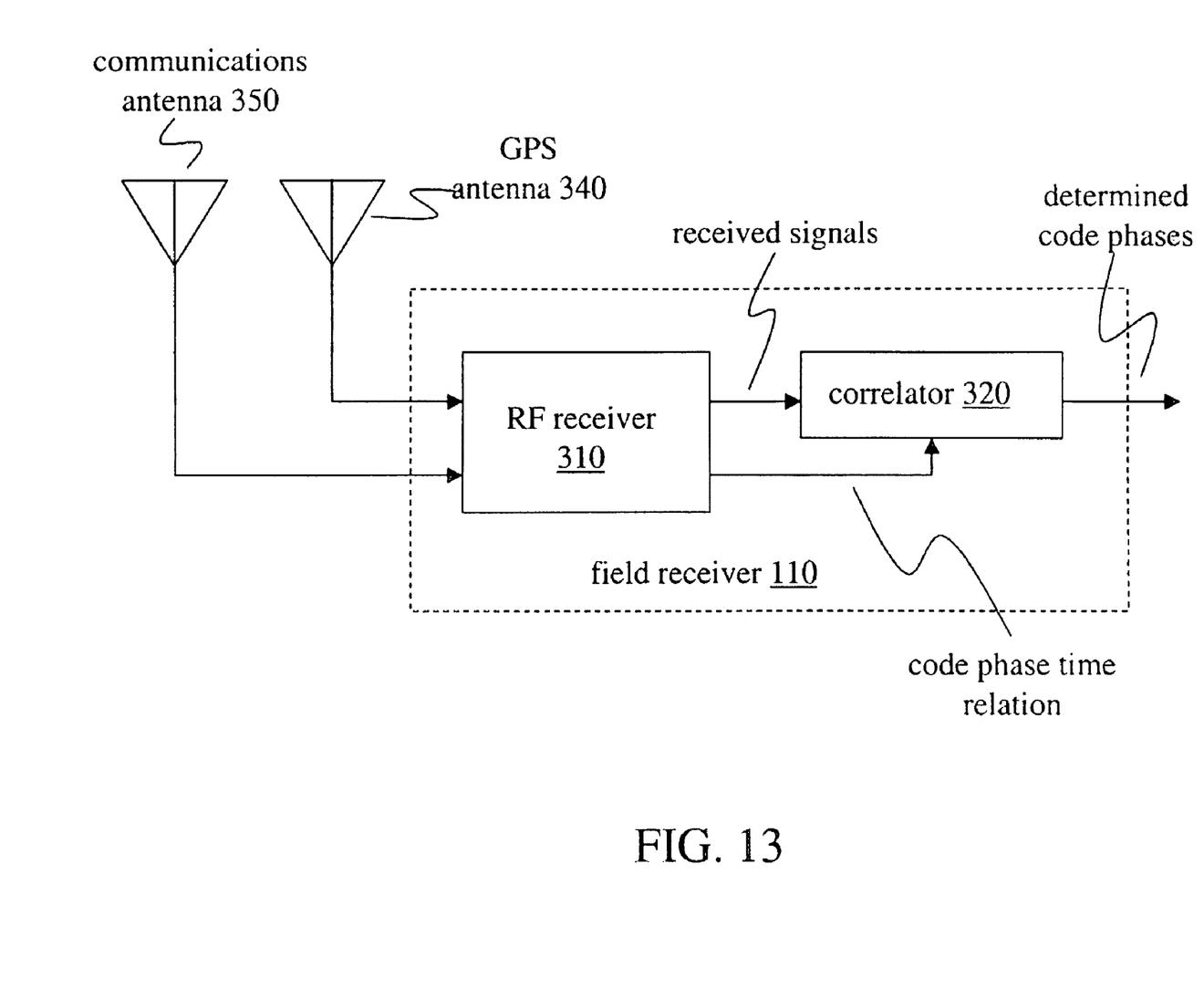
FIG. 13 shows a block diagram for an exemplary implementation of an apparatus 110 according to an embodiment of the invention.
Figure 14:
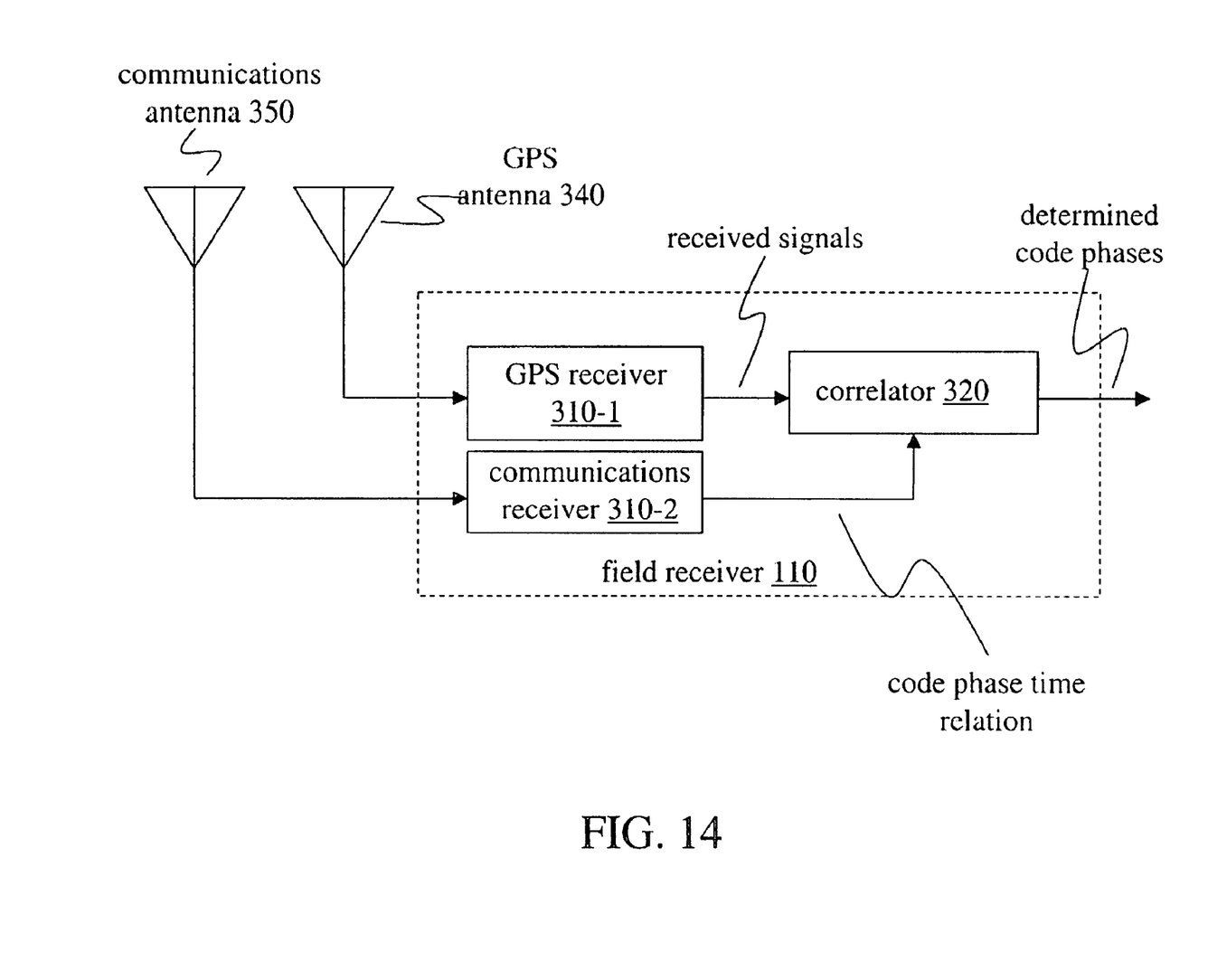
FIG. 14 shows a block diagram for another exemplary implementation of an apparatus 110 according to an embodiment of the invention.

In an exemplary implementation of field receiver 110 as shown in FIG. 13, RF receiver receives the signals from the SVs via GPS antenna 340 and the reference signal (e.g. from reference receiver 120) via communications antenna 350. RF receiver 310 may be an integrated unit, or RF receiver 310 may comprise two discrete units (GPS receiver 310-1 and communications receiver 310-2) as shown in FIG. 14.

Figure 2:
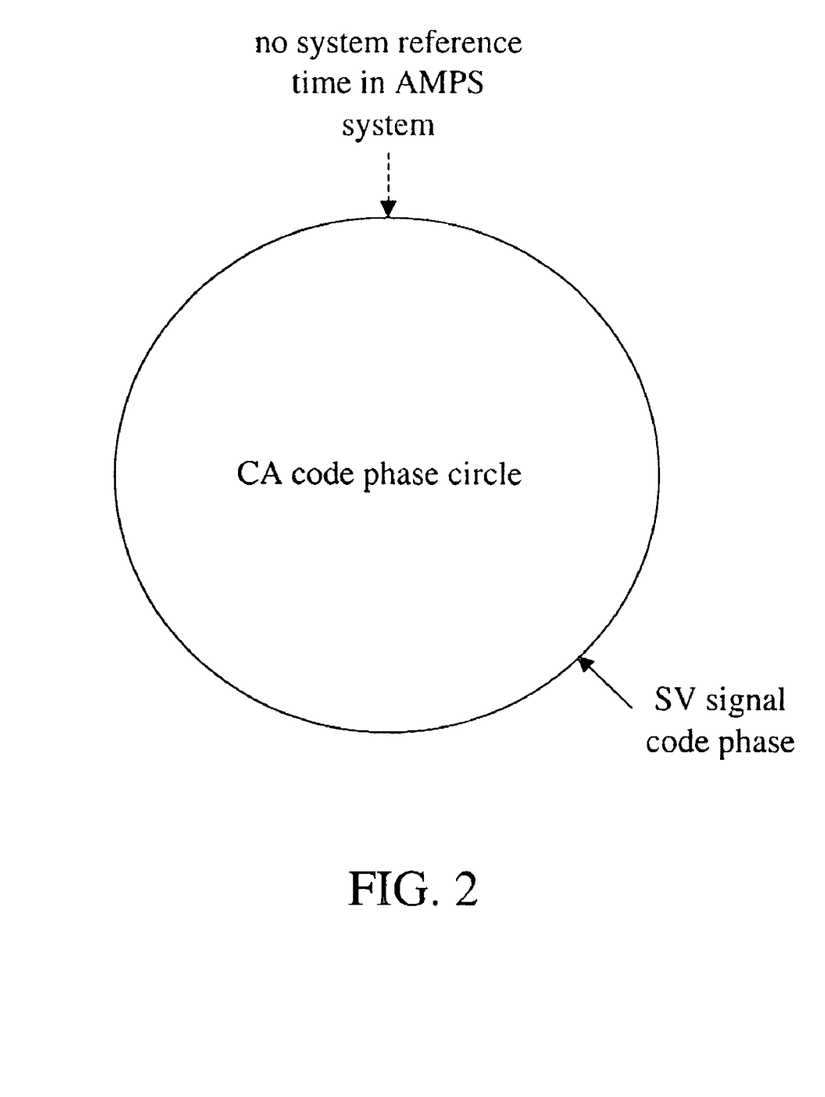
FIG. 2 shows an AMPS system that lacks a system reference time.

In the client-server architecture of the invention as shown in FIG. 2, the central server has its own GPS receiver that knows exactly where the satellites are in the sky, the frequencies of those satellites and the timing differences between the satellites and the server, among other information. The server may send information to the client identifying the satellites in view so that the client does not have to search for every satellite but rather only for the satellites for which the client has a reasonable chance of receiving signals. For example, the server may forward information relating to the code sequences corresponding to the SVs in view (e.g. the sequences themselves, or one or more indices into a predetermined table of code sequences). The server may also send the Doppler frequency information of the satellites to the client. Additionally, the server may send the timing of the satellites (e.g. one or more time differences between code phases) to the client. It may be desirable for the server to transmit these three kinds of information in the order in which they are presented above.

Accordingly, the acquisition search space or time for a GPS receiver in a client is significantly reduced in the invention. In a wireless GPS client-server architecture according to an embodiment of the invention, transmission of the relative timing of the satellites by the server may reduce the search space for the client even in cases where no timing reference is available at the client or where no common time reference is available between the client and the server.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method for improving the acquisition time of positioning signals received by a mobile station, comprising:
   receiving a composite signal, the composite signal including a plurality of positioning signals;
   determining a code phase of each of the plurality of positioning signals by calculating a correlation, for each of the plurality of received signals, between a corresponding code sequence and a signal based at least in part on the composite signal;
   determining a time difference between the code phases of at least a first and a second positioning signal of the plurality of positioning signals; and
   transmitting the time difference from a transmitter to the mobile station.

2. The method of claim 1, further comprising:
   receiving the first and second positioning signals at the mobile station; and
   reducing a search space for the code phase of the second positioning signal based at least in part on said time difference.

3. The method according to claim 1, wherein each of the plurality of received positioning signals has a corresponding periodic code, and
   wherein each code phase of the plurality of positioning signals relates to a given position within the corresponding periodic code.

4. The method according to claim 1, wherein each of the plurality of received positioning signals is based at least in part on a corresponding direct-sequence spread spectrum modulated signal.

5. The method according to claim 1, wherein each of the plurality of received signals is based at least in part on a corresponding direct-sequence pseudonoise modulated signal.

6. The method according to claim 1, wherein the first positioning signal has a corresponding periodic code and the second positioning signal has a corresponding periodic code, and
   wherein the code phase of the first positioning signal and the code phase of the second positioning signal each relate to a corresponding position within the corresponding periodic code.

7. The method according to claim 1, wherein the plurality of received positioning signals are transmitted from one or more space vehicles.

8. The method of claim 7, wherein the plurality of received positioning signals include at least one of GPS and GLONASS signals.

9. The method of claim 1, wherein the receiving step receives the plurality of positioning signals at a reference receiver remote from the mobile station.

10. The method according to claim 9, wherein the mobile station and the reference receiver are unsynchronized in time.

11. A reference receiver, comprising:
    a receiver configured to receive a composite signal, the composite signal including a plurality of positioning signals;
    a correlator configured to (i) determine a code phase of each of the plurality of positioning signals by calculating a correlation, for each of the plurality of received signals, between a corresponding code sequence and a signal based at least in part on the composite signal, and further configured to (ii) determine a time difference between the code phases of at least a first and a second positioning signal of the plurality of positioning signals; and
    a transmitter configured to transmit the time difference to a mobile station.

12. The reference receiver of claim 11, wherein the mobile station receives the first and second positioning signal and reduces a search space for the code phase of the second positioning signal based at least in part on said time difference.

13. The reference receiver according to claim 11, wherein each of the plurality of received positioning signals has a corresponding periodic code, and
    wherein each code phase of the plurality of positioning signals relates to a given position within the corresponding periodic code.

14. The reference receiver according to claim 11, wherein each of the plurality of received positioning signals is based at least in part on a corresponding direct-sequence spread spectrum modulated signal.

15. The reference receiver according to claim 11, wherein each of the plurality of received signals is based at least in part on a corresponding direct-sequence pseudonoise modulated signal.

16. The reference receiver according to claim 11, wherein the first positioning signal has a corresponding periodic code and the second positioning signal has a corresponding periodic code, and
wherein the code phase of the first positioning signal and the code phase of the second positioning signal each relate to a corresponding position within the corresponding periodic code.

17. The reference receiver according to claim 11, wherein the plurality of received positioning signals are transmitted from one or more space vehicles.

18. The reference receiver of claim 17, wherein the plurality of received positioning signals include at least one of GPS and GLONASS signals.

19. The reference receiver of claim 11, wherein the reference receiver is remote from the mobile station.

20. The reference receiver according to claim 19, wherein the mobile station and the reference receiver are unsynchronized in time.

21. A reference receiver, comprising:
means for receiving a composite signal, the composite signal including a plurality of positioning signals;
means for determining a code phase of each of the plurality of positioning signals by calculating a correlation, for each of the plurality of received signals, between a corresponding code sequence and a signal based at least in part on the composite signal;
means for determining a time difference between the code phases of at least a first and a second positioning signal of the plurality of positioning signals; and
means for transmitting the time difference to the mobile station.

22. The reference receiver of claim 21, further comprising:
means for receiving the first and second positioning signals at the mobile station; and
means for reducing a search space for the code phase of the second positioning signal based at least in part on said time difference.

23. The reference receiver according to claim 21, wherein each of the plurality of received positioning signals has a corresponding periodic code, and
wherein each code phase of the plurality of positioning signals relates to a given position within the corresponding periodic code.

24. The reference receiver according to claim 21, wherein each of the plurality of received positioning signals is based at least in part on a corresponding direct-sequence spread spectrum modulated signal.

25. The reference receiver according to claim 21, wherein each of the plurality of received signals is based at least in part on a corresponding direct-sequence pseudonoise modulated signal.

26. The reference receiver according to claim 21, wherein the first positioning signal has a corresponding periodic code and the second positioning signal has a corresponding periodic code, and
wherein the code phase of the first positioning signal and the code phase of the second positioning signal each relate to a corresponding position within the corresponding periodic code.

27. The reference receiver according to claim 21, wherein the plurality of received positioning signals are transmitted from one or more space vehicles.

28. The reference receiver of claim 27, wherein the plurality of received positioning signals include at least one of GPS and GLONASS signals.

29. The reference receiver of claim 21, wherein the means for receiving receives the plurality of positioning signals at a reference receiver remote from the mobile station.

30. The reference receiver according to claim 29, wherein the mobile station and the reference receiver are unsynchronized in time.

31. A computer-readable medium including program code stored thereon, comprising:
program code to receive a composite signal, the composite signal including a plurality of positioning signals;
program code to (i) determine a code phase of each of the plurality of positioning signals by calculating a correlation, for each of the plurality of received signals, between a corresponding code sequence and a signal based at least in part on the composite signal, and further configured to (ii) determine a time difference between the code phases of at least a first and a second positioning signal of the plurality of positioning signals; and
program code to transmit the time difference to a mobile station.

32. The computer-readable medium of claim 31, wherein the mobile station receives the first and second positioning signal and reduces a search space for the code phase of the second positioning signal based at least in part on said time difference.

33. The computer-readable medium according to claim 31, wherein each of the plurality of received positioning signals has a corresponding periodic code, and
wherein each code phase of the plurality of positioning signals relates to a given position within the corresponding periodic code.

34. The computer-readable medium according to claim 31, wherein each of the plurality of received positioning signals is based at least in part on a corresponding direct-sequence spread spectrum modulated signal.

35. The computer-readable medium according to claim 31, wherein each of the plurality of received signals is based at least in part on a corresponding direct-sequence pseudonoise modulated signal.

36. The computer-readable medium according to claim 31, wherein the first positioning signal has a corresponding periodic code and the second positioning signal has a corresponding periodic code, and
wherein the code phase of the first positioning signal and the code phase of the second positioning signal each relate to a corresponding position within the corresponding periodic code.

37. The computer-readable medium according to claim 31, wherein the plurality of received positioning signals are transmitted from one or more space vehicles.

38. The computer-readable medium of claim 37, wherein the plurality of received positioning signals include at least one of GPS and GLONASS signals.

39. The computer-readable medium of claim 31, wherein program code to receive the composite signal is remote from the mobile station.

40. The computer-readable medium according to claim 39, wherein the mobile station and a reference receiver including the program code to receiver, determine and transmit are unsynchronized in time.

* * * * *